United States Patent
Ravault

[11] 3,895,917
[45] July 22, 1975

[54] GAS REACTORS INCLUDING FOAM-STRUCTURED CERAMIC BODY WITH INTEGRAL INTERNAL CERAMIC BAFFLES

[75] Inventor: Frank Ernest George Ravault, Birmingham, England

[73] Assignee: Foseco International Limited, Birmingham, England

[22] Filed: Dec. 29, 1972

[21] Appl. No.: 319,847

[30] Foreign Application Priority Data
Jan. 14, 1972   United Kingdom............... 1932/72

[52] U.S. Cl.......... 23/277 C; 23/288 R; 23/288 FC; 161/159; 252/477 R
[51] Int. Cl.².... B01J 8/00; F01N 3/10; F01N 3/15
[58] Field of Search........... 23/277 C, 288 F, 288 R; 252/477 R

[56] References Cited
UNITED STATES PATENTS

| | | | |
|---|---|---|---|
| 2,478,194 | 8/1949 | Houdry | 252/477 R |
| 3,259,453 | 7/1966 | Stiles | 23/288 F X |
| 3,495,950 | 2/1970 | Barber et al. | 23/288 F |
| 3,533,753 | 10/1970 | Berger | 23/288 F |
| 3,711,259 | 1/1973 | Gurney | 48/192 |
| 3,755,204 | 8/1973 | Sergeys | 252/477 R |
| 3,785,781 | 1/1974 | Hervert et al. | 23/288 F |
| 3,798,006 | 3/1974 | Balluff | 23/288 F |
| 3,799,796 | 3/1974 | Hunter | 23/288 F X |

Primary Examiner—Joseph Scovronek
Attorney, Agent, or Firm—Cushman, Darby & Cushman

[57] ABSTRACT

Reactor elements suitable, e.g. for use in exhaust gas reactors, comprise a body of porous foam-structured ceramic material having integral internal ceramic baffles.

5 Claims, 1 Drawing Figure

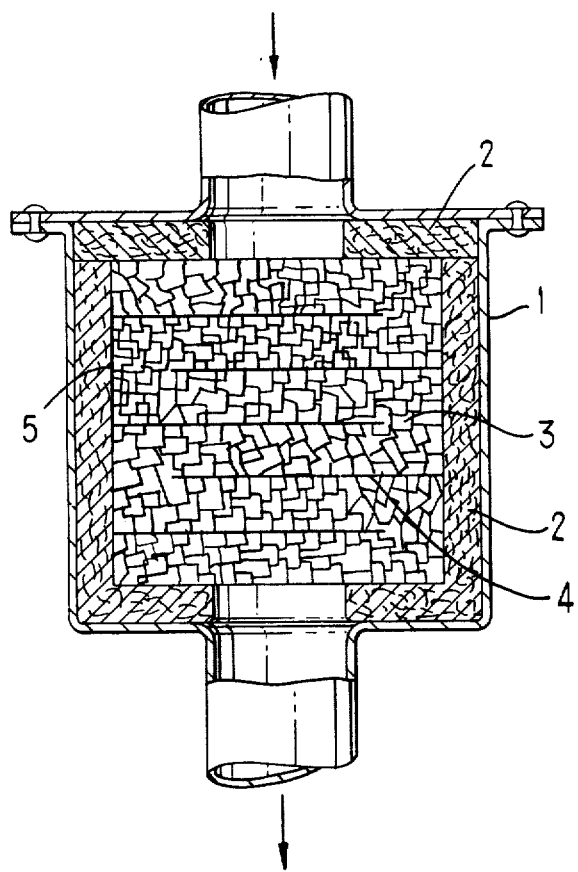

GAS REACTORS INCLUDING FOAM-STRUCTURED CERAMIC BODY WITH INTEGRAL INTERNAL CERAMIC BAFFLES

This invention relates to gas reactors.

Among the various means of reducing the levels of carbon monoxide and unburnt hydrocarbons in the exhaust gases of internal combustion engines is the introduction of extra air under pressure into the exhaust stream, for example, into the exhaust ports of the cylinder head (or cylinder block in the case of a side valve engine), which brings about the oxidation of these objectionable gases to a harmless mixture of carbon dioxide and steam.

It is obviously desirable for the air-exhaust gas mixture to be maintained at a high temperature for as long as possible in order that oxidation may proceed to completion. With this end in view, the gas mixture is fed into a chamber known as "exhaust gas reactor" which is close to the engine (to conserve heat) and commonly contains a more or less elaborate arrangement of baffles for the purpose of increasing, within a compact space, the distance which must be travelled by the gas mixture, hence increasing the opportunity for components of the gas mixture to react. Some reactors may contain catalytic materials of various kinds in order to promote, respectively, reduction of oxides of nitrogen and, in the presence of air, oxidation of organic matter in the exhaust gases.

Many of the proposals require the provisions of some sort of reactor box which will withstand both high temperatures and highly corrosive conditions; this generally requires the use of expensive constructional materials such as nickel alloys which are, in addition, hard to fabricate.

Another area of use of gas reactors is in chemical technology where a fluid stream may need to undergo a catalytic treatment. For effecting this, the fluid stream may pass through a reactor containing the catalyst supported on a suitable support. Clearly, in order to achieve satisfactory treatment, it is desirable to make the fluid stream travel a long path and, for this purpose, baffles may be used.

According to a first feature of the present invention there is provided a reactor element comprising a body of porous foam-structured ceramic material having integral internal ceramic baffles. In use this element is set in a suitable casing and the fluid to be treated is arranged to be passed through the reactor element. Because of the integral baffles, the fluid describes a long tortuous path and effective treatment is obtained. Because the baffles are integral, leakage around gaps between baffles and the porous material of the element is eliminated and the whole unit is robust and able to withstand handling and vibration.

Methods of making porous ceramic materials suitable for use in reactor elements according to the present invention are described in British Pat. Specifications 923862, 916784, 1004352, 1019807, 1054421. In these methods the general procedure is to take a body of porous organic foam material, e.g. polyurethane foam, impregnate the foam with a slurry of finely divided ceramic material, usually in water, and finally dry and fire the so-obtained structure. The organic foam disappears on firing to leave a ceramic structure. In order to ensure coherence the slurry may contain a binder such as a clay, a phosphate or sodium silicate.

Preferred for use in the present invention are such porous ceramic materials which are made starting from a reticular organic foam. The strength, permeability and uniformity of permeability of such material are preferably very high, and in order to achieve this, use may be made of the techniques described in our copending applications 1927/72, 1929/72 and 1930/72 (F.S. 705, 707 and 708 respectively) filed on even date herewith.

As indicated above, one type of reactor of importance is the exhaust gas reactor. This may comprise a chamber containing a reactor element of highly permeable porous ceramic material, the element being held in the chamber by a packing of heat-insulating refractory material, and the element containing baffles within it to urge the exhaust gases to describe a tortuous path through the highly permeable porous ceramic material. The baffles may, for example, extend completely across the element dividing it into separate layers, apertures being provided at the side of the element to allow gases emerging from one layer to enter the next. Alternatively, the baffles may extend from alternate sides of the element towards but not reaching the opposite side. The baffles are formed by a thin layer of impermeable ceramic material integral with the porous ceramic material. The external surface of the reactor element may also be rendered impermeable. Methods of effecting impermeable surface layers by glazing are disclosed in our copending application 1931/72 (F.S. 709) filed on even date herewith and these may be used for the outside of the reactor element. Impermeable baffles in the body of porous material may be made by using layers of porous sheet material e.g. paper which have been dipped in a ceramic containing slurry, preferably identical with the slurry used in the manufacture of the porous ceramic and laid in between slabs of slurry impregnated foam material. The whole body is then dried and fired to a sufficient temperature to form a ceramic bond between the refractory particles. After firing, the paper and foam have disappeared, but the ceramic structure remains.

Naturally the path length, pore size, overall permeability and path cross-section can all be varied at will, and adjusted to allow sufficient time for the reactions to proceed to completion without providing so great a resistance to gas flow that the performance of the engine is seriously impaired.

The oxidation of the organic components of the exhaust gases may take place either simply due to the length of time they are kept hot, or, if desired, the highly permeable porous refractory material may contain agents to promote the required chemical changes, e.g. the ceramic may contain, support or be entirely composed of a catalyst. Reactors designed to rid the exhaust gases of oxides of nitrogen will always contain a catalyst.

The ceramic reactor element, when used as an exhaust gas reactor, is preferably mounted in a container which insulates it both from heat losses and from mechanical shock and vibration.

The production and use of reactor elements for purposes other than exhaust gas treatment is, of course, analogous. The porous ceramic material may be made in any convenient shape or size and have desired properties imparted to it during manufacture or after manufacture. The mounting of the reactor element may also be effected in any convenient fashion to suit the circumstances of use.

The invention is illustrated, by way of example, with reference to the accompanying drawing which shows a longitudinal section through an exhaust gas reactor including a reactor element according to this invention.

Referring to the drawing, an exhaust gas reactor consists of a metal casing 1 lined with a layer of fibrous heat-insulating refractory material 2. The block 3 includes integrally formed baffles 4 so that exhaust gases entering the casing from the top (as shown in the drawing,) follow a tortuous zig-zag path through block 3.

In order to make the device shown in the accompanying drawing, the following procedure was followed:

Sheets of a reticulated polyurethane with between 4 and 8 pores per linear cm, 25 mm thick, were dipped in a 0.01% by weight solution of an anionic polyacrylamide in a 50/50 methanol/water mixture, centrifuged, and dried in hot air.

A slip was made by stirring together the following materials:

| | parts by weight |
|---|---|
| Dextrin | 20 |
| Kaolin | 50 |
| Petalite (all less than 0.075mm) | 50 |
| Water | 100 |
| Monoethanolamine | 15 |

To each litre of slip were added 5 ml. each of silicone emulsion and a high molecular weight alcohol, as described in our copending application 1930/72 (F.S. 708).

Pieces of absorbent paper were cut the same width as the polyester sheets but 25mm or more shorter. This size was 1.25 times the size of the desired final product, to allow for firing shrinkage.

The pieces of treated polyester were dipped into the slip, centrifuged free from surplus slip, and dried in a microwave oven. They were then dipped a second time into the polyacrylamide solution, centrifuged and dried as before. They were then dipped a second time into the ceramic slip and centrifuged. The absorbent paper can then be coated by dipping into the slip, but since this forms a double layer structure when the paper is subsequently burnt out, it was coated on one side by floating it on the surface of the slip.

Pieces of slip coated foam and pieces of slip coated paper were then assembled alternately to form a pile of the structure shown in the drawing. The resultant body was dried in a microwave oven, then heated at a rate not exceeding 100°C/hr. to 1250°C, held at 1250°C for 16 hours, then cooled at a rate not exceeding 100°C/hr., preferably 50°C/hr.

A sleeve 2 and cap 2 were made of fibrous ceramic insulating material according to the method described in our copending application 18638/71 with internal dimensions corresponding to the external dimensions of the ceramic body made above, smeared internally with a suitable ceramic bonding agent, and the ceramic body pushed into the sleeve. The whole was then assembled in the metal casing 1, which on account of the insulation afforded by the fibrous ceramic material can be constructed from mild steel sheet or other inexpensive materials.

The porous ceramic body can be provided with a fibrous ceramic jacket 2 by applying vacuum, e.g. to its upper and lower surfaces and immersing in a fibrous slurry, with subsequent drying and firing if necessary: if the binder for the jacket is colloidal silica sol, firing is unnecessary.

The porous ceramic body 3 can be provided with virtually impermeable side-walls by assembling it whilst still in its unfired state inside a tube of absorbent paper treated with slip, then firing as before. Optionally, after firing, these side walls can be glazed; as shown at 5 in the drawing.

It is found important in the type of construction just described to hold the block 3 firmly in place. This is particularly so in internal combustion engined vehicles where the whole engine unit is subject to considerable vibration. For this purpose tight packing can be used, or the block may be held gently compressed e.g. by springs.

I claim as my invention:

1. A reactor element comprising a body of porous foam-structured ceramic material made by impregnating an organic foam with a slurry of ceramic material, drying and firing the foam, and having integral therewith a plurality of internal impermeable baffles defining a tortuous path through the element and formed by locating in the so impregnated foamed body, prior to firing, layers of porous sheet material impregnated with ceramic slurry at the positions where it is desired to have the baffles in the finished element.

2. The reactor element of claim 1 wherein the exterior side walls of the element are at least partly covered with an impermeable ceramic coating.

3. An exhaust gas reactor comprising
   a chamber,
   a reactor element mounted in said chamber and comprising a body of porous foam-structured ceramic material made by impregnating an organic foam with a slurry of ceramic material, drying and firing the foam, and having integral therewith a plurality of internal impermeable baffles defining a tortuous path through the element and formed by locating in the so impregnated foamed body, prior to firing, layers of porous sheet material impregnated with ceramic slurry at the positions where it is desired to have baffles in the finished element, and
   an exhaust gas feed and outlet whereby gas fed to the chamber is made to follow a tortuous path through the reactor elements by the baffles.

4. The exhaust gas reactor of claim 3 wherein the element is held in the casing via a layer of refractory heat-insulating material.

5. The exhaust gas reactor of claim 4 wherein the heat-insulating material is a fibrous ceramic.

* * * * *